US009568652B1

(12) United States Patent
Fry

(10) Patent No.: US 9,568,652 B1
(45) Date of Patent: Feb. 14, 2017

(54) REFLECTING PRISM, AND RELATED COMPONENTS, SYSTEMS, AND METHODS

(71) Applicant: Lockheed Martin Corporation, Bethesda, MD (US)

(72) Inventor: James Alexander Fry, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 16 days.

(21) Appl. No.: 14/804,757

(22) Filed: Jul. 21, 2015

(51) Int. Cl.
*G02B 5/04* (2006.01)
*G02B 17/04* (2006.01)

(52) U.S. Cl.
CPC ............... *G02B 5/04* (2013.01); *G02B 17/045* (2013.01)

(58) Field of Classification Search
CPC ........... G02B 5/04; G02B 5/12; G02B 17/045; G02B 32/02; G02B 6/0016; G02B 6/0031; G02B 17/04
USPC .................................. 359/835, 836; 355/50
See application file for complete search history.

(56) References Cited

U.S. PATENT DOCUMENTS

| 8,743,489 | B2 * | 6/2014 | Perger | G02B 17/045 359/835 |
| 2009/0310105 | A1 * | 12/2009 | Kuriyama | G02B 5/12 355/50 |
| 2012/0140349 | A1 | 6/2012 | Perger | |

OTHER PUBLICATIONS

Hopkins, Robert E., "Section 13: Mirror and Prism Systems," Military Standardization Handbook: Optical Design (book), MIL-HDBK-141, Oct. 5, 1962, University of Rochester, pp. 13-1 to 13-52.
Lord, Chris J.R., "Field Glasses and prismatic binoculars suitable for astronomy," Binocular Collection, www.brayebrookobservatory.org/BrayObsWebSite/HOMEPAGE/BINOCOLL.html, last updated Aug. 24, 2010, 36 pages.

* cited by examiner

*Primary Examiner* — Euncha Cherry
(74) *Attorney, Agent, or Firm* — Withrow & Terranova, PLLC

(57) ABSTRACT

A reflecting prism has an input surface, an output surface, a first reflection surface, a second reflection surface, and a third reflection surface. The reflecting prism has a first refractive index, such that the first, second, and third reflection surfaces interface with an external medium having a second refractive index less than the first refractive index. This interface defines a critical angle for total internal reflection for each of the first, second, and third reflection surfaces. Light is received at the input surface of a prism body of a reflecting prism and is transmitted along a first internal optical path segment of an optical path to the first reflection surface. The angle of incidence of the first internal optical path segment with respect to the first reflection surface is greater than the critical angle for the first reflection surface, thereby causing the light to be reflected via total internal reflection.

22 Claims, 6 Drawing Sheets

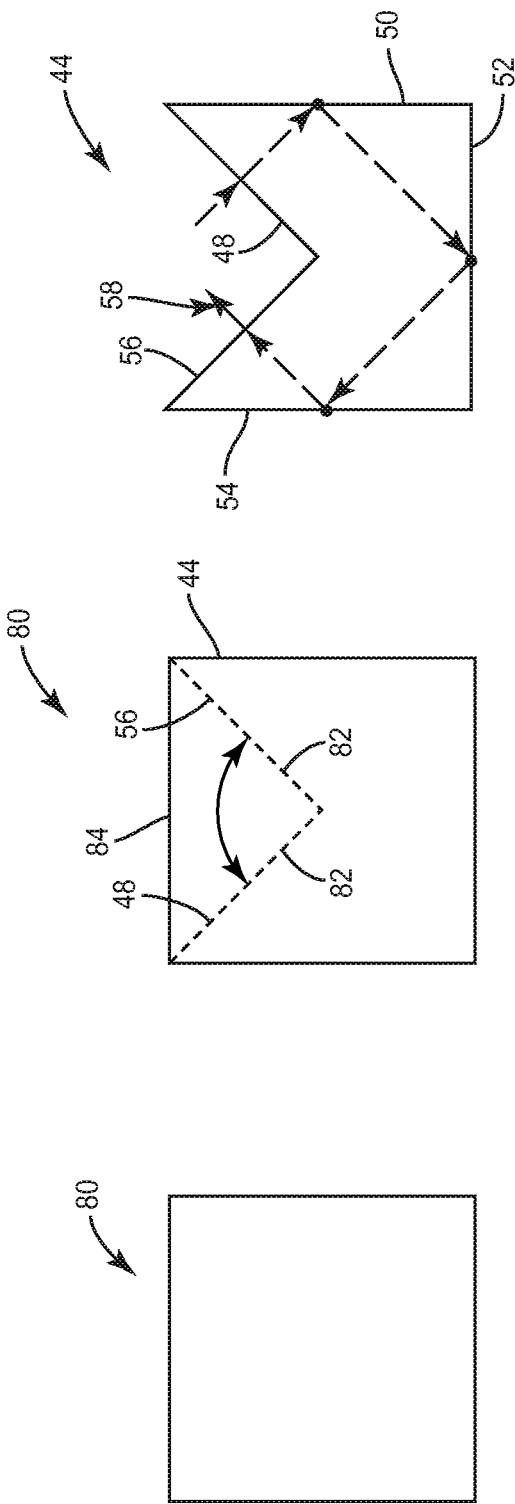

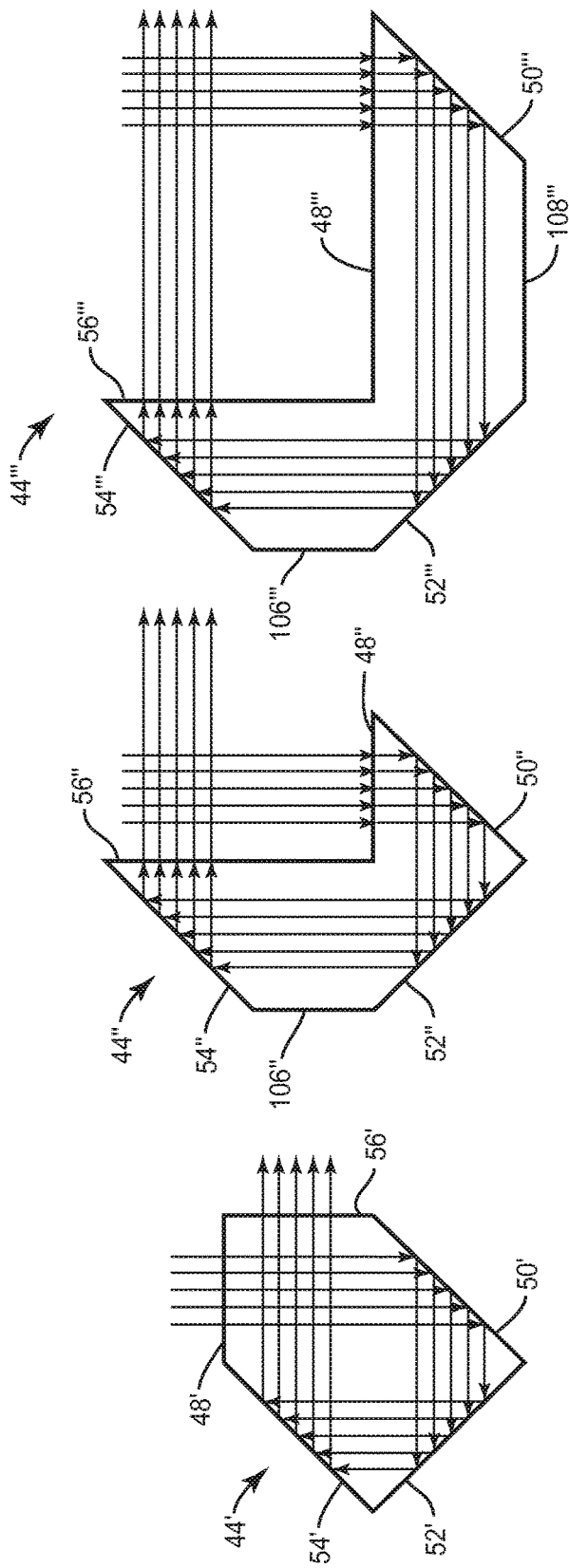

REFLECTING PRISM, AND RELATED COMPONENTS, SYSTEMS, AND METHODS

TECHNICAL FIELD

The embodiments relate to reflecting prisms for directing electromagnetic radiation along an optical path.

BACKGROUND

Optics relates to the behavior and properties of light, i.e., electromagnetic radiation that includes visible, infrared, and ultraviolet spectra. Many optical systems employ components for directing and focusing light along one or more optical paths, with some components defining a particular focal length for some or all of the optical path. Generally, optical systems that require long focal lengths also require long physical path lengths. In many applications, packaging constraints do not allow for the inclusion of continuous linear path segments of sufficient length to accommodate the required focal length. This problem can be overcome by folding of the optical path, i.e., deviating an optical beam within a volume to allow the beam to travel the required distance without leaving the physical boundaries of the volume.

Folding of the optical path is commonly accomplished using prisms and/or mirrors, which are configured to redirect the optical beam and allow the beam to have a sufficiently long focal length in a volume without excessive physical length in any dimension. These arrangements typically require precise positioning and alignment of each prism and/or mirror so that the light does not deviate from its intended optical path, e.g., along its optical axis. Accordingly, there is a need in the art for components, systems, and methods that allow for high-quality and cost-effective folding of an optical path within a volume.

SUMMARY

Embodiments include a reflecting prism for directing light along an optical path, and related systems and methods. In one embodiment, a reflecting prism has an input surface, an output surface, a first reflection surface, a second reflection surface, and a third reflection surface. The reflecting prism also has a first refractive index, such that the first, second, and third reflection surfaces interface with an external medium having a second refractive index less than the first refractive index. This interface between the reflecting prism and the external medium defines a critical angle for total internal reflection for each of the first, second, and third reflection surfaces. Light is received at the input surface of a prism body of a reflecting prism and is transmitted along a first internal optical path segment of an optical path to the first reflection surface. The angle of incidence of the first internal optical path segment with respect to the first reflection surface is greater than the critical angle for the first reflection surface, thereby causing the light to be reflected via total internal reflection.

The light is reflected from the first reflection surface along a second internal optical path segment of the optical path to the second reflection surface, wherein an angle of incidence of the second internal optical path segment with respect to the second reflection surface is greater than the critical angle for the second reflection surface. The light is then reflected from the second reflection surface along a third internal optical path segment of the optical path to the third reflection surface, wherein an angle of incidence of the third internal optical path segment with respect to the third reflection surface is greater than the critical angle for the third reflection surface. The light is finally reflected from the third reflection surface along a fourth internal optical path segment of the optical path to the output surface of the prism body and is transmitted from the reflecting prism via the output surface of the prism body.

One advantage of this arrangement is that the reflecting prism can be formed without the need for a reflective coating on one or more of the reflection surfaces. Further, in some embodiments, the geometry of the reflecting prism allows the prism to be formed from a substantially cubic element, and requires only two cuts to form a finished component. In this manner, a reflecting prism can be formed inexpensively and easily using fewer process steps than conventional components.

In one exemplary embodiment a reflecting prism is disclosed. The reflecting prism comprises a prism body comprising a material that is transmissive to light. The prism body also comprises an input surface of the prism body. The prism body also comprises a first reflection surface of the prism body arranged at a substantially 45° angle to the input surface. The prism body also comprises a second reflection surface of the prism body arranged at a substantially 45° angle to the input surface, and at a substantially orthogonal angle to the first reflection surface. The prism body also comprises a third reflection surface of the prism body arranged at a substantially 45° angle to the input surface, substantially parallel to the first reflection surface, and at a substantially orthogonal angle to the second reflection surface. The prism body also comprises an output surface of the prism body arranged at a substantially orthogonal angle to the input surface, at a substantially 45° angle to the first reflection surface, at a substantially 45° angle to the second reflection surface, and at a substantially 45° angle to the input surface.

In another exemplary embodiment, a system for directing light along an optical path is disclosed. The system comprises a volume of a medium having a first refractive index and a reflecting prism. The reflecting prism comprises a prism body having a second refractive index greater than the first refractive index, the prism body having an input surface, an output surface, a first reflection surface, a second reflection surface, and a third reflection surface. The first reflection surface, second reflection surface, and third reflection surface each define a respective interface with the volume of air, thereby defining a respective critical angle for each of the first reflection surface, second reflection surface, and third reflection surface. The reflecting prism defines an optical path such that a first internal optical path segment of the optical path extends between the input surface and the first reflecting surface such that an angle of incidence of the first internal optical path segment with respect to the first reflection surface is greater than the critical angle for the first reflection surface. A second internal optical path segment of the optical path extends from the first internal optical path segment between the first reflecting surface and second reflecting surface such that an angle of incidence of the second internal optical path segment with respect to the second reflection surface is greater than the critical angle for the second reflection surface. A third internal optical path segment of the optical path extends from the second internal optical path segment between the second reflecting surface and third reflecting surface such that an angle of incidence of the third internal optical path segment with respect to the third reflection surface is greater than the critical angle for the third reflection surface. A fourth internal optical path segment of the optical path extends from the third internal optical path segment between the third reflection surface and the output surface.

In another exemplary embodiment, a method of directing light along an optical path is disclosed. The method comprises receiving light at an input surface of a prism body of a reflecting prism. The method further comprises transmitting the light into the prism body from the input surface along a first internal optical path segment of an optical path, wherein the first internal optical path segment is substantially orthogonal to the input surface. The method further comprises reflecting the light from the first internal optical path segment to a second internal optical path segment of the optical path, wherein the second internal optical path segment is substantially orthogonal to the first internal optical path segment. The method further comprises reflecting the light from the second internal optical path segment to a third internal optical path segment of the optical path, wherein the third internal optical path segment is substantially parallel to the first internal optical path segment, and is substantially orthogonal to the second internal optical path segment. The method further comprises reflecting the light from the third internal optical path segment to a fourth internal optical path segment of the optical path, wherein the fourth internal optical path segment is substantially orthogonal to the first internal optical path segment, and is substantially orthogonal to the second internal optical path segment.

In another exemplary embodiment, a method of directing light along an optical path is disclosed. The method comprises providing a reflecting prism having an input surface, an output surface, a first reflection surface, a second reflection surface, and a third reflection surface, wherein the reflecting prism has a first refractive index, and the first reflection surface, second reflection surface, and third reflection surface interface with an external medium having a second refractive index less than the first refractive index, thereby defining a critical angle for each of the first reflection surface, second reflection surface, and third reflection surface. The method further comprises receiving light at the input surface of a prism body of a reflecting prism. The method further comprises transmitting the light from the input surface along a first internal optical path segment of an optical path to the first reflection surface, wherein an angle of incidence of the first internal optical path segment with respect to the first reflection surface is greater than the critical angle for the first reflection surface. The method further comprises reflecting the light from the first reflection surface along a second internal optical path segment of the optical path to the second reflection surface, wherein an angle of incidence of the second internal optical path segment with respect to the second reflection surface is greater than the critical angle for the second reflection surface. The method further comprises reflecting the light from the second reflection surface along a third internal optical path segment of the optical path to the third reflection surface, wherein an angle of incidence of the third internal optical path segment with respect to the third reflection surface is greater than the critical angle for the third reflection surface. The method further comprises reflecting the light from the third reflection surface along a fourth internal optical path segment of the optical path to the output surface of the prism body. The method further comprises transmitting the light from the reflecting prism via the output surface of the prism body.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 3A-3C illustrate cross sectional views of an exemplary process for forming the reflecting prism of FIGS. 2A and 2B;

FIGS. 6A-6C illustrate reflecting prisms according to alternative embodiments having different prism geometries.

DETAILED DESCRIPTION

Figure 1:
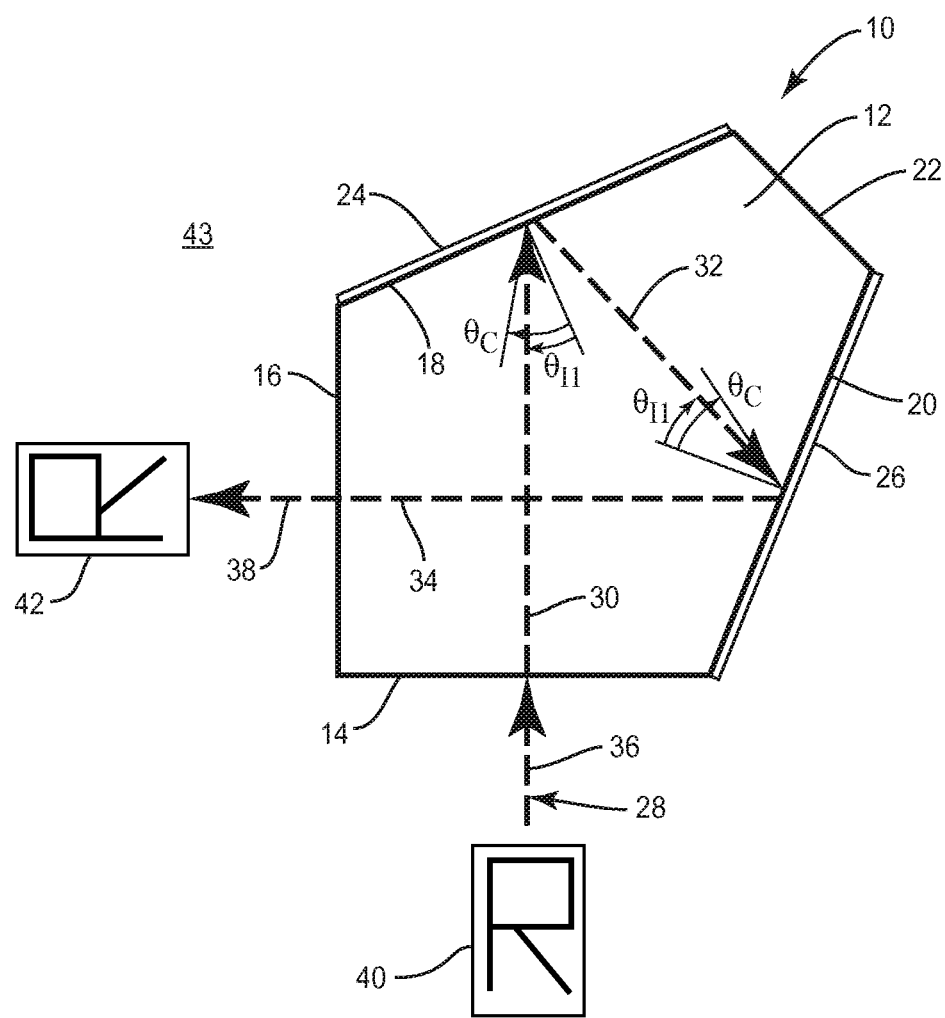
FIG. 1 illustrates a cross-sectional view of a conventional reflecting prism according to the prior art.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments include a reflecting prism for directing light along an optical path, and related systems and methods. In one embodiment, a reflecting prism has an input surface, an output surface, a first reflection surface, a second reflection surface, and a third reflection surface. The reflecting prism also has a first refractive index, such that the first, second, and third reflection surfaces interface with an external medium having a second refractive index less than the first refractive index. This interface between the reflecting prism and the external medium defines a critical angle for total internal reflection for each of the first, second, and third reflection surfaces. Light is received at the input surface of a prism body of a reflecting prism and is transmitted along a first internal optical path segment of an optical path to the first reflection surface. The angle of incidence of the first internal optical path segment with respect to the first reflection surface is greater than the critical angle for the first reflection surface, thereby causing the light to be reflected via total internal reflection.

The light is reflected from the first reflection surface along a second internal optical path segment of the optical path to the second reflection surface, wherein an angle of incidence of the second internal optical path segment with respect to the second reflection surface is greater than the critical angle for the second reflection surface. The light is then reflected from the second reflection surface along a third internal optical path segment of the optical path to the third reflection surface, wherein an angle of incidence of the third internal optical path segment with respect to the third reflection surface is greater than the critical angle for the third reflection surface. The light is finally reflected from the third reflection surface along a fourth internal optical path segment of the optical path to the output surface of the prism body and is transmitted from the reflecting prism via the output surface of the prism body.

One advantage of this arrangement is that the reflecting prism can be formed without the need for a reflective coating on some or all of the reflection surfaces. Further, in some embodiments, the geometry of the reflecting prism allows the prism to be formed from a substantially cubic element, and requires only two cuts to form the finished component. In this manner, a reflecting prism can be formed inexpensively and easily using fewer process steps than conventional components.

As used herein, the term "light" refers to electromagnetic radiation having a wavelength in the range of substantially 100 nm to substantially 12,000 nm, comprising visible light, ultraviolet light, and infrared light. As used herein, the term "visible light" refers to electromagnetic radiation having a wavelength in the range of substantially 400 nm to substantially 700 nm. As used herein, the term "ultraviolet light" refers to electromagnetic radiation having a wavelength in the range of substantially 100 nm to 400 nm. As used herein, the term "infrared light" refers to electromagnetic radiation having a wavelength in the range of substantially 700 nm to 12,000 nm. Infrared light can also be subdivided into near-IR, short-wave IR, mid-wave IR, and long-wave IR wavelength bands, as is well known in the art.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first reflection surface" and "second reflection surface," and does not imply a priority, a type, an importance, or other attribute, unless otherwise stated herein. The term "substantially" used herein in conjunction with a numeric value means any value that is within a range of five percent greater than or five percent less than the numeric value.

Before discussing these and other embodiments, FIG. 1 illustrates a conventional reflecting prism 10 according to the prior art. The reflecting prism 10, known in the art as a "penta" prism, has a prism body 12 with an input surface 14 and an output surface 16. The prism body 12 also includes first and second reflection surfaces 18, 20 and a back surface 22. The first reflection surface 18 has a first layer of a reflective material 24 attached thereto, and the second reflection surface 20 has a similar second layer of a reflective material 26 attached thereto. These first and second layers of the reflective material 24, 26 allow the first and second reflection surfaces 18, 20 to define an optical path 28 that enters the prism body 12 through the input surface 14 and exits the prism body 12 from the output surface 16. For example, a first internal optical path segment 30 extends between the input surface 14 and the first reflection surface 18, where it is reflected toward the second reflection surface 20 along a second internal optical path segment 32. The light next is reflected by the second reflection surface 20 toward the output surface 16 along a third internal optical path segment 34. In this manner, the light is able to enter the input surface 14 via an input optical path segment 36 of the optical path 28, and is then redirected to exit the output surface 16 of the prism body 12 along the output optical path segment 38. In the example of FIG. 1, the light defining an input image 40 is directed along the optical path 28 through the prism body 12, where it is reflected and the output from the output surface 16 as an output image 42.

This arrangement has a number of drawbacks. For example, forming the "penta" prism 10 of FIG. 1 from a rectangular prism of glass or other suitable material requires multiple cuts at irregular angles to form a pentagon shape of the reflecting prism 10. In addition, additional process steps are required to add the first and second layers of the reflective material 24, 26 to respective first and second reflection surfaces 18, 20. If these first and second layers of the reflective material 24 are not present, the first and second reflection surfaces 18, 20 will be unable to reflect the light from the respective first and second internal optical path segments 30, 32, because each of the first and second internal optical path segments 30, 32 approaches the respective first or second reflection surface 18, 20 an incident angle that is less than the critical angle defined by the reflecting prism 10 and an external medium 43, such as air.

In this regard, the reflecting prism 10 has a first refractive index. When any of the external surfaces 14, 16, 18, 20, 22 of the reflecting prism 10 interface with an external medium 43, e.g., air, having a second refractive index less than the first refractive index, this interface between the reflecting prism 10 and the external medium 43 defines a critical angle for total internal reflection for each of the external surfaces. For example, for N-F2 optical glass in an air medium, the critical angle $\theta_C$ is approximately 38.5° When the light travelling through the reflecting prism 10 reaches one of the external surfaces 14, 16, 18, 20, 22 at an incident angle, i.e., an angle with respect to the normal of the respective surface, less than the critical angle, the light will pass through the external surfaces 14, 16, 18, 20, 22 into the external medium 43. Here, the incident angle $\theta_{I1}$ for each of the first internal optical path segment 30 and the second internal optical path segment 32 with respect to the respective first and second reflection surfaces 18, 20 is 22.5°. Thus, the first and second layers of reflective material 24, 26 are required for the reflecting prism 10 to function properly, because the light will pass through a glass-air boundary in the absence of such material. Thus the reflecting prism 10 requires additional process steps to function properly, which contributes to the cost and complexity to the reflecting prism 10.

Figure 2A:
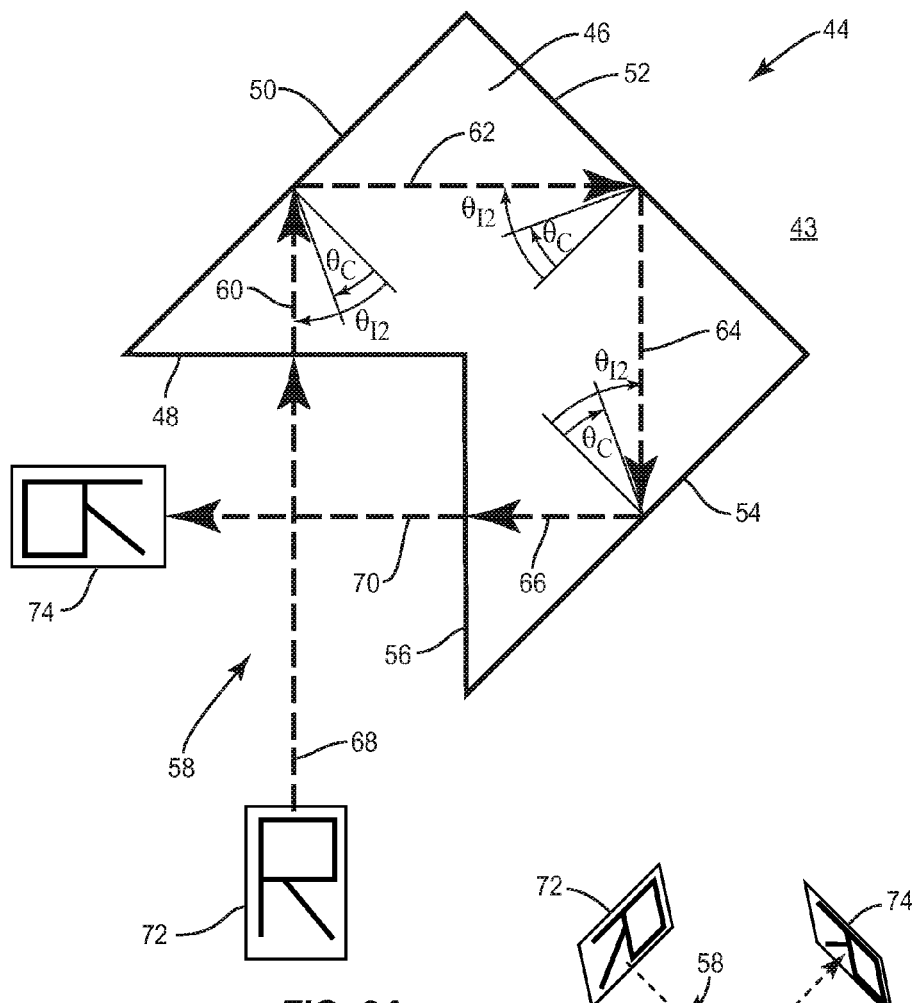
FIGS. 2A and 2B illustrate cross-sectional and perspective views of a reflecting prism according to an exemplary embodiment.
Figure 2B:
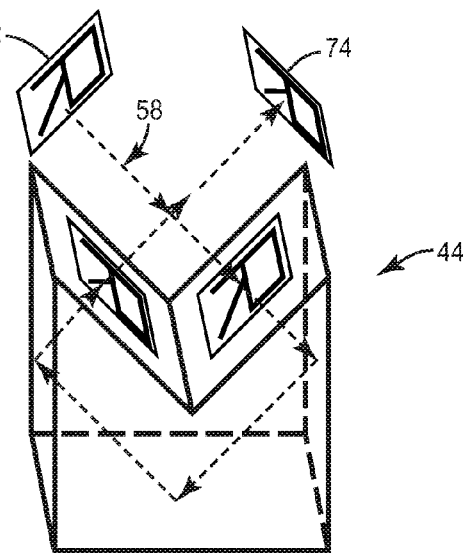

Referring now to FIGS. 2A and 2B, a reflecting prism 44 according to one embodiment is disclosed. The reflecting prism 44 includes a prism body 46 having an input surface 48, a first reflection surface 50, a second reflection surface 52, a third reflection surface 54, and an output surface 56. For purposes of comparison, the reflecting prism 44 has the same first refractive index as the reflecting prism 10 of FIG. 1. Thus, when any of the external surfaces 48, 50, 52, 54, 56 interface with an external medium 43 having a second refractive index less than the first refractive index, this interface between the reflecting prism 44 and the external medium 43 defines a critical angle for total internal reflection for each of the first, second, and third reflection surfaces 50, 52, 54. As discussed above with respect to FIG. 1, when the prism body 46 is formed from N-F2 optical glass and the external medium 43 is air, the critical angle $\theta_C$ is 38.5°.

In the embodiment of FIGS. 2A and 2B, the light is received at the input surface 48 of the prism body 46 and is transmitted along an optical path 58. A first internal optical path segment 60 of the optical path 58 extends from the input surface 48 to the first reflecting surface 50. Unlike the reflecting prism 10 of FIG. 1, however, the angle of incidence $\theta_{I2}$ of the first internal optical path segment 60 with respect to the first reflection surface 50 of the reflecting prism 44 of FIGS. 2A and 2B is 45°, which is greater than the critical angle $\theta_C$ (i.e., 38.5°) for the first reflection surface 50. Thus, the light reaching the first reflection surface 50 via the first internal optical path segment 60 is completely reflected via total internal reflection based on the interface between the prism body 46 and the external medium 43 only. Unlike the reflecting prism 10 of FIG. 1, the reflective prism 44 does not require any additional materials, such as layers of reflective material, thereby reducing the complexity and cost of the reflecting prism 44.

The light is reflected from the first reflection surface 50 along a second internal optical path segment 62 of the optical path 58 to the second reflection surface 52, wherein the angle of incidence $\theta_{I2}$ of the second internal optical path segment 62 with respect to the second reflection surface 52 is again 45°, which is greater than the critical angle $\theta_C$ for the second reflection surface 52. The light is next reflected from the second reflection surface 52 along a third internal optical path segment 64 of the optical path 58 to the third reflection surface 54, wherein the angle of incidence $\theta_{I2}$ of the third internal optical path segment 64 with respect to the third reflection surface 54 is also 45°, which is greater than the critical angle $\theta_C$ for the third reflection surface 54. The light is then reflected from the third reflection surface 54 along a fourth internal optical path segment 66 of the optical path 58 to the output surface 56 of the prism body 46 and is transmitted from the reflecting prism 44 via the output surface 56 of the prism body 46.

In this embodiment, the light is transmitted along an input optical path segment 68 of the optical path 58 through the input surface 48 of the prism body 46. The light likewise exits the prism body 46 via the output surface 56 along an output optical path segment 70 of the optical path 58. In this embodiment, the input optical path segment 68 is substantially collinear with the first internal optical path segment 60 because the input optical path segment 68 is substantially orthogonal to the input surface 48, but it should be understood that other embodiments may include an input optical path segment that is not collinear with an internal path segment, for example, where the input optical path segment is not orthogonal to an input surface. Likewise, the output optical path segment 70 in this embodiment is substantially collinear with the fourth internal optical path segment 66 because the fourth internal optical path segment 66 is substantially orthogonal to the output surface 56, and it should be understood that this may not be the case in other embodiments for similar reasons discussed above with respect to the input optical path segment 68. In this embodiment, the first, second, third, and fourth internal optical path segments 60, 62, 64, 66 are substantially coplanar with each other, but it should also be understood that other arrangements are possible based on adjusting prism geometries.

In this manner, the light carrying an input image 72 may be transmitted through the reflecting prism 44 and output as an output image 74. In this embodiment, the output image 74 is reversed with respect to the input image 72, but it should be understood that the embodiments disclosed herein are not so limited. As discussed above, one advantage of this arrangement is that, unlike the reflecting prism 10 of FIG. 1, the reflecting prism 44 of FIGS. 2A and 2B can be formed without the need for a reflective coating on one or more of the reflection surfaces 50, 52, 54, because the required reflections within the prism body 46 operate via total internal reflection. Further, as discussed below with respect to FIGS. 3A through 3C, the geometry of the reflecting prism 44 in some embodiments allows the reflecting prism 44 to be formed from a substantially cubic element, and requires only two cuts 82 to form the finished component. In this manner, a reflecting prism can be formed inexpensively and easily using fewer process steps than conventional components.

Referring now to FIGS. 3A through 3C, a process for forming a reflecting prism, such as the reflecting prism 44 of FIGS. 2A and 2B, is illustrated. FIG. 3A illustrates a monolithic blank prism 80 having a substantially cubic profile and formed from optical glass or other suitable material. For example, a suitable material may be a material that is optically transparent to at least one wavelength of light. As shown by FIG. 3B, the blank prism 80 may be formed into the reflecting prism 44 of FIGS. 2A and 2B by making only two cuts 82 in the blank prism 80, thereby defining the input surface 48 and the output surface 56 of the reflecting prism 44. The excess material 84 from the cuts 82 may be discarded. As shown in FIG. 3C, following the two cuts 82, the finished reflecting prism 44 is a monolithic component having the input and the output surfaces 48, 56, as well as the first, second, and third reflection surfaces 50, 52, 54, and is now fully configured to perform its function of redirecting and/or consuming the focal length of the light along the optical path 58 without any additional process steps.

Figure 4C:
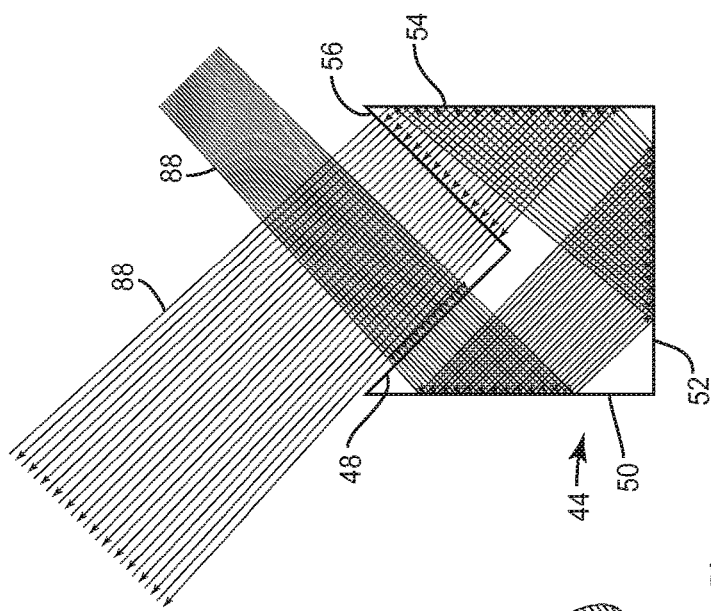
FIGS. 4A-4C illustrate perspective and cross-sectional views of the reflecting prism of FIGS. 2A and 2B folding a diverging light beam.
Figure 4B:
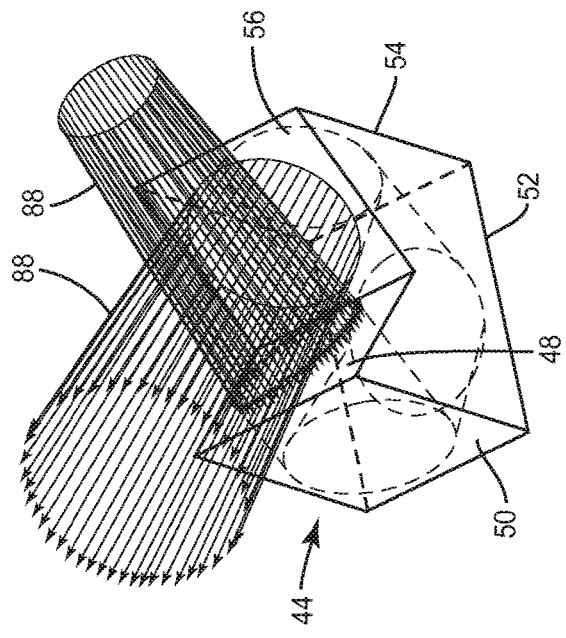
Figure 4A:
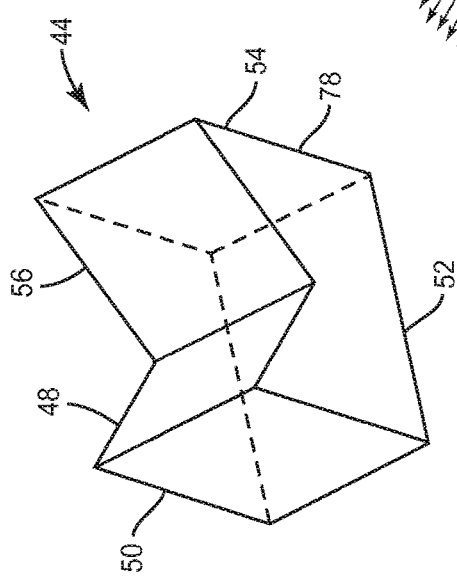

The reflecting prism 44 of FIGS. 2A and 2B is suitable for use with a number of different types of light beams. In this regard, FIGS. 4A through 4C illustrate the use of the reflecting prism 44 of FIGS. 2A and 2B with a diverging light beam. In this example, FIG. 4A illustrates a three dimensional view of the reflecting prism 44, including a bottom surface 78 and a top surface (not shown) arranged perpendicular to the input surface 48, the first, second, and third reflection surfaces 50, 52, 54, and the output surface 56. FIG. 4B illustrates a divergent light beam 88 being directed into the input surface 48 of the reflecting prism 44. As the divergent light beam 88 is reflected by the reflection surfaces 50, 52, 54 through the reflecting prism 44, the divergent light beam 88 continues to diverge, and exits the output surface 56 having a significantly larger cross-sectional area than when the divergent light beam 88 entered the input surface 48. FIG. 4C illustrates a cross-sectional view of the arrangement of FIG. 4B, and also illustrates the divergence of the divergent light beam 88 as it travels through the reflecting prism 44.

Figure 5:
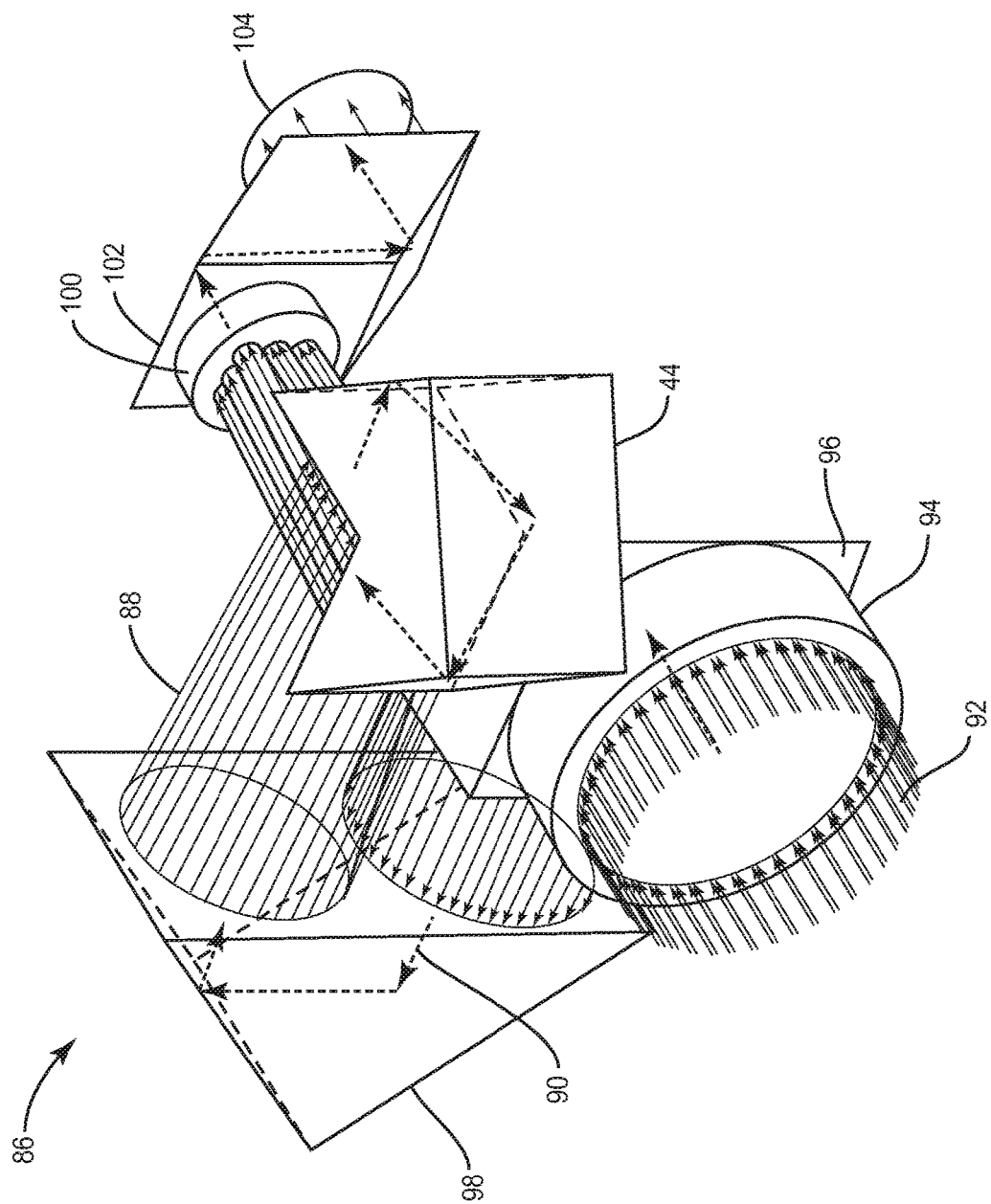
FIG. 5 illustrates an exemplary system for folding a converging light beam in a limited volume including the reflecting prism of FIGS. 2A and 2B.

The reflecting prism 44 can be used in a number of applications, and may also be used in conjunction with additional prisms or different types of prisms. In this regard, FIG. 5 illustrates a system 86 for capturing and redirecting a converging light beam, such as the light beam 88. In this embodiment, the system 86 includes the internal components of an optical turret, though it should be understood that other components and embodiments may be used with other applications as well. In the embodiment of FIG. 5, the system 86 defines an optical path 90 through the system 86. A light 92 from a scene is first received at a converging lens 94, where it is redirected into a conventional right angle prism 96. The right angle prism 96 redirects the converging light beam 88 into a conventional porro prism 98. The porro prism 98 redirects the light toward the reflecting prism 44, where it is received and redirected toward a lens 100. The lens 100 directs the light through a conventional rhomboid prism 102 where it is output to a detector 104. The detector 104 may comprise, for example, a focal plane array sensitive to light in the infrared wavelengths, or a CCD or CMOS sensor sensitive to light in the visible spectrum. In this manner, the reflecting prism 44 may be used to redirect a significant portion of the focal length of the light beam 88 within a relatively small volume, thereby permitting the light beam 88 to converge to cover a smaller area while minimizing the space required for the components of the system 86.

It should be understood that it is not necessary for a reflecting prism to have the same dimensions as the reflecting prism 44 of FIGS. 2A-5 above. For example, the input surface 48, output surface 56, and reflection surfaces 50, 52, 54 of the reflecting prism 44 define a concave polygon in cross-section, with the input surface 48 and the output surface 56 having an interior angle greater than 180° (270° in this embodiment). In another embodiment, however, FIG. 6A illustrates a reflecting prism 44' having surface dimensions similar to embodiments disclosed by FIGS. 2A through 5, but in this embodiment, the input surface 48', output surface 56', and reflection surfaces 50', 52', 54' define a convex polygon in cross-section, with the interior angle of each respective pair of adjacent surfaces having an interior angle less than 180°. In another embodiment, FIG. 6B illustrates an alternative reflecting prism 44" in which a third reflection surface 54' is separated from a second reflection surface 52" by an additional distance. In this embodiment, the reflecting prism 44" includes a side wall 106" to accommodate this increase in length. Likewise, FIG. 6C illustrates another alternative reflecting prism 54''', in which a first reflection surface 50''' is also separated from a second reflection surface 52''' by an additional distance. Thus, in this example, the reflecting prism 54''' has two additional side walls 106''' and 108'''. It should be understood that these and other arrangements may be used for example, for redirecting and/or altering an optical path, accommodating certain geometries, or other reasons.

Those skilled in the art will recognize improvements and modifications to the preferred embodiments of the disclosure. All such improvements and modifications are considered within the scope of the concepts disclosed herein and the claims that follow.

What is claimed is:

1. A reflecting prism comprising:
   a prism body comprising a material that is transmissive to light, the prism body having:
      an input surface;
      a first reflection surface arranged at a substantially 45° angle to the input surface;
      a second reflection surface arranged at a substantially 45° angle to the input surface, and at a substantially orthogonal angle to the first reflection surface;
      a third reflection surface arranged at a substantially 45° angle to the input surface, substantially parallel to the first reflection surface, and at a substantially orthogonal angle to the second reflection surface; and
      an output surface arranged at a substantially orthogonal angle to the input surface, at a substantially 45° angle to the first reflection surface, at a substantially 45° angle to the second reflection surface, and at a substantially 45° angle to the input surface.

2. The reflecting prism of claim 1, wherein the prism defines an optical path comprising:
   a first internal optical path segment extending between the input surface and the first reflection surface, the first internal optical path segment being at a substantially orthogonal angle to the input surface and at a substantially 45° angle to the first reflection surface;
   a second internal optical path segment extending between the first reflection surface and the second reflection surface, the second internal optical path segment being at a substantially 45° angle to the first reflection surface, at a substantially 45° angle to the second reflection surface, and at a substantially orthogonal angle to the first internal optical path segment;
   a third internal optical path segment extending between the second reflection surface and the third reflection surface, the third internal optical path segment being at a substantially 45° angle to the second reflection surface, at a substantially 45° angle to the third reflection surface, substantially parallel to the first internal optical path segment, and at a substantially orthogonal angle to the second internal optical path segment; and
   a fourth internal optical path segment extending between the third reflection surface and the output surface, the fourth internal optical path segment being at a substantially 45° angle to the third reflection surface, at a substantially orthogonal angle to the third reflection surface, at a substantially orthogonal angle to the first internal optical path segment, substantially parallel to the second internal optical path segment, and at a substantially orthogonal angle to the third internal optical path segment.

3. The reflecting prism of claim 2, wherein the optical path further comprises:
   an input optical path segment extending from the input surface away from the prism body, the input optical path segment being substantially collinear with the first internal optical path segment; and
   an output optical path segment extending from the output surface away from the prism body, the output optical path segment being substantially collinear with the fourth internal optical path segment, and at a substantially orthogonal angle to the input optical path segment, wherein a fifth optical path intersects a sixth internal optical path segment.

4. The reflecting prism of claim 3, wherein the first, second, third, and fourth internal optical path segments and the input and output optical path segments are substantially coplanar with each other.

5. The reflecting prism of claim 3, wherein:
   the input surface is configured to transmit light from the input optical path segment therethrough to the first internal optical path segment;
   the first reflection surface is configured to reflect the light from the first internal optical path segment to the second internal optical path segment;
   the second reflection surface is configured to reflect the light from the second internal optical path segment to the third internal optical path segment;
   the third reflection surface is configured to reflect the light from the third internal optical path segment to the fourth internal optical path segment; and
   the output surface is configured to transmit the light from the fourth internal optical path segment therethrough to the output optical path segment.

6. The reflecting prism of claim 5, wherein:
   the first reflection surface is configured to reflect the light from the first internal optical path segment to the second internal optical path segment by total internal reflection;
   the second reflection surface is configured to reflect the light from the second internal optical path segment to the third internal optical path segment by total internal reflection; and
   the third reflection surface is configured to reflect the light from the third internal optical path segment to the fourth internal optical path segment by total internal reflection.

7. The reflecting prism of claim 1, wherein the prism body is optically transparent to at least one wavelength of light.

8. The reflecting prism of claim 1, wherein the prism body has a first refractive index, and the first reflection surface, second reflection surface, and third reflection surface are configured to interface with an external medium having a second refractive index lower than the first refractive index, thereby defining a critical angle for each of the first reflection surface, second reflection surface, and third reflection surface.

9. The reflecting prism of claim 1, wherein the prism body is composed of optical material having a refractive index such that a critical angle of each of the first reflection surface, second reflection surface, and third reflection surface is at least 90° when the first reflection surface, second reflection surface, and third reflection surface interface with an external medium composed of air.

10. The reflecting prism of claim 9, wherein the first reflection surface, second reflection surface, and third reflection surface are devoid of an external reflective material.

11. The reflecting prism of claim 1, wherein the reflecting prism is a unitary component.

12. The reflecting prism of claim 11, wherein the reflecting prism is a monolithic glass component.

13. The reflecting prism of claim 1, wherein the prism body is transmissive to visible light.

14. The reflecting prism of claim 1, wherein the prism body is transmissive to infrared light.

15. The reflecting prism of claim 1, wherein the prism body is transmissive to ultraviolet light.

16. A system for directing light along an optical path comprising:
   a volume of a medium having a first refractive index; and
   a reflecting prism comprising:
      a prism body having a second refractive index greater than the first refractive index, the prism body having an input surface, an output surface, a first reflection surface, a second reflection surface, and a third reflection surface, wherein the first reflection surface, second reflection surface, and third reflection surface each define a respective interface with a volume of air, thereby defining a respective critical angle for each of the first reflection surface, second reflection surface, and third reflection surface;
   wherein the reflecting prism defines an optical path such that:
      a first internal optical path segment of the optical path extends between the input surface and the first reflecting surface such that an angle of incidence of the first internal optical path segment with respect to the first reflection surface is greater than the critical angle for the first reflection surface;
      a second internal optical path segment of the optical path extends from the first internal optical path segment between the first reflecting surface and second reflecting surface such that an angle of incidence of the second internal optical path segment with respect to the second reflection surface is greater than the critical angle for the second reflection surface;
      a third internal optical path segment of the optical path extends from the second internal optical path segment between the second reflecting surface and third reflecting surface such that an angle of incidence of the third internal optical path segment with respect to the third reflection surface is greater than the critical angle for the third reflection surface; and
      a fourth internal optical path segment of the optical path extends from the third internal optical path segment between the third reflection surface and the output surface.

17. The system of claim 16, wherein the first reflecting surface is orthogonal to the second reflecting surface, and the second reflecting surface is orthogonal to the third reflecting surface.

18. The system of claim 16, wherein the first internal optical path segment is substantially orthogonal to the input surface and the fourth internal optical path substantially segment is orthogonal to the output surface.

19. A method of directing light along an optical path, the method comprising:
   receiving light at an input surface of a prism body of a reflecting prism;
   transmitting the light into the prism body from the input surface along a first internal optical path segment of an optical path, wherein the first internal optical path segment is substantially orthogonal to the input surface;
   reflecting the light from the first internal optical path segment to a second internal optical path segment of the optical path, wherein the second internal optical path segment is substantially orthogonal to the first internal optical path segment;
   reflecting the light from the second internal optical path segment to a third internal optical path segment of the optical path, wherein the third internal optical path segment is substantially parallel to the first internal optical path segment, and is substantially orthogonal to the second internal optical path segment; and
   reflecting the light from the third internal optical path segment to a fourth internal optical path segment of the optical path, wherein the fourth internal optical path segment is substantially orthogonal to the first internal optical path segment, is substantially parallel to the second internal optical path segment, and is substantially orthogonal to the third internal optical path segment.

20. The method of claim 19, wherein the prism body has a first refractive index, and a first reflecting surface, second reflecting surface, and third reflecting surface interface with an external medium having a second refractive index lower than the first refractive index.

21. The method of claim 20, wherein the external medium is air.

22. A method of directing light along an optical path, the method comprising:
   providing a reflecting prism having an input surface, an output surface, a first reflection surface, a second reflection surface, and a third reflection surface, wherein the reflecting prism has a first refractive index, and the first reflection surface, second reflection surface, and third reflection surface interface with an external medium having a second refractive index less than the first refractive index, thereby defining a critical angle for each of the first reflection surface, second reflection surface, and third reflection surface;
   receiving light at the input surface of a prism body of a reflecting prism; transmitting the light from the input surface along a first internal optical path segment of an optical path to the first reflection surface, wherein an angle of incidence of the first internal optical path segment with respect to the first reflection surface is greater than the critical angle for the first reflection surface;

reflecting the light from the first reflection surface along a second internal optical path segment of the optical path to the second reflection surface, wherein an angle of incidence of the second internal optical path segment with respect to the second reflection surface is greater than the critical angle for the second reflection surface;

reflecting the light from the second reflection surface along a third internal optical path segment of the optical path to the third reflection surface, wherein an angle of incidence of the third internal optical path segment with respect to the third reflection surface is greater than the critical angle for the third reflection surface;

reflecting the light from the third reflection surface along a fourth internal optical path segment of the optical path to the output surface of the prism body; and transmitting the light from the reflecting prism via the output surface of the prism body.

\* \* \* \* \*